United States Patent [19]

Meyerand, Jr.

[11] 4,263,110
[45] Apr. 21, 1981

[54] HYDROGEN-BROMINE GENERATION UTILIZING SEMICONDUCTING PLATELETS SUSPENDED IN A VERTICALLY FLOWING ELECTROLYTE SOLUTION

[75] Inventor: Russell G. Meyerand, Jr., Glastonbury, Conn.

[73] Assignee: United Technologies Corporation, Hartford, Conn.

[21] Appl. No.: 104,252

[22] Filed: Dec. 17, 1979

[51] Int. Cl.³ .......................... C25B 1/02; C25B 1/24
[52] U.S. Cl. .................................. 204/128; 204/129; 204/222; 204/DIG. 3; 429/111
[58] Field of Search ......... 204/128, 129, 222, DIG. 3; 429/111

[56]  References Cited
U.S. PATENT DOCUMENTS

| | | | |
|---|---|---|---|
| 3,756,930 | 9/1973 | Weiss et al. | 204/129 |
| 3,941,669 | 3/1976 | Bharucha et al. | 204/105 R |
| 3,954,577 | 5/1976 | Levine | 204/59 R |
| 4,011,149 | 3/1977 | Nozik | 204/129 |
| 4,021,323 | 5/1977 | Kilby et al. | 204/129 |
| 4,042,758 | 8/1977 | Weinstein et al. | 429/111 |
| 4,069,120 | 1/1978 | Meyerand, Jr. et al. | 204/129 |
| 4,088,556 | 5/1978 | Pellegri et al. | 204/222 |
| 4,094,751 | 6/1978 | Nozik | 204/80 |
| 4,110,180 | 8/1978 | Nidola et al. | 204/128 |
| 4,128,701 | 12/1978 | Maricle | 429/21 |
| 4,129,683 | 12/1978 | Maricle | 429/21 |
| 4,137,136 | 1/1979 | Ueda et al. | 204/98 |
| 4,147,600 | 4/1979 | Rutherford et al. | 204/98 |
| 4,147,602 | 4/1979 | Garbuny et al. | 204/157.1 R |

OTHER PUBLICATIONS

S. N. Frank et al., "Semiconductor Electrodes. 12. Photoassisted Oxidations and Photoelectrosynthesis at Polycrystalline $TiO_2$ Electrodes," *J. Am. Chem. Soc.*, vol. 99, Jul. 1977, pp. 4667-4675.

W. Glass et al., "Performance of Hydrogen-Bromine Fuel Cells", *Advances In Chemistry*, vol. 47 (1965), Am. Chem. Soc., pp. 203-219.

*Primary Examiner*—Aaron Weisstuch
*Attorney, Agent, or Firm*—Harry J. Gwinnell

[57]  ABSTRACT

Hydrogen and bromine are produced from a bromide-containing electrolyte solution by suspending semiconducting platelets in a vertically flowing solution of the electrolyte contained in a radiant energy transparent vertically disposed fluid conduit. The fluid conduit is impinged with radiant energy of sufficient wavelength to cause charge transfer in the platelets dissociating the electrolyte solution into bromine liquid and hydrogen gas. The platelets are maintained suspended in the vertically flowing electrolyte by controlling the flow rate of the electrolyte solution. The respective dissociation products are collected for subsequent energy generation. The semiconducting platelets comprise an n-doped semiconducting layer, ohmic contact, and p-doped semiconducting layer, at least the edge of the ohmic contact being covered by an insulation layer.

6 Claims, 4 Drawing Figures

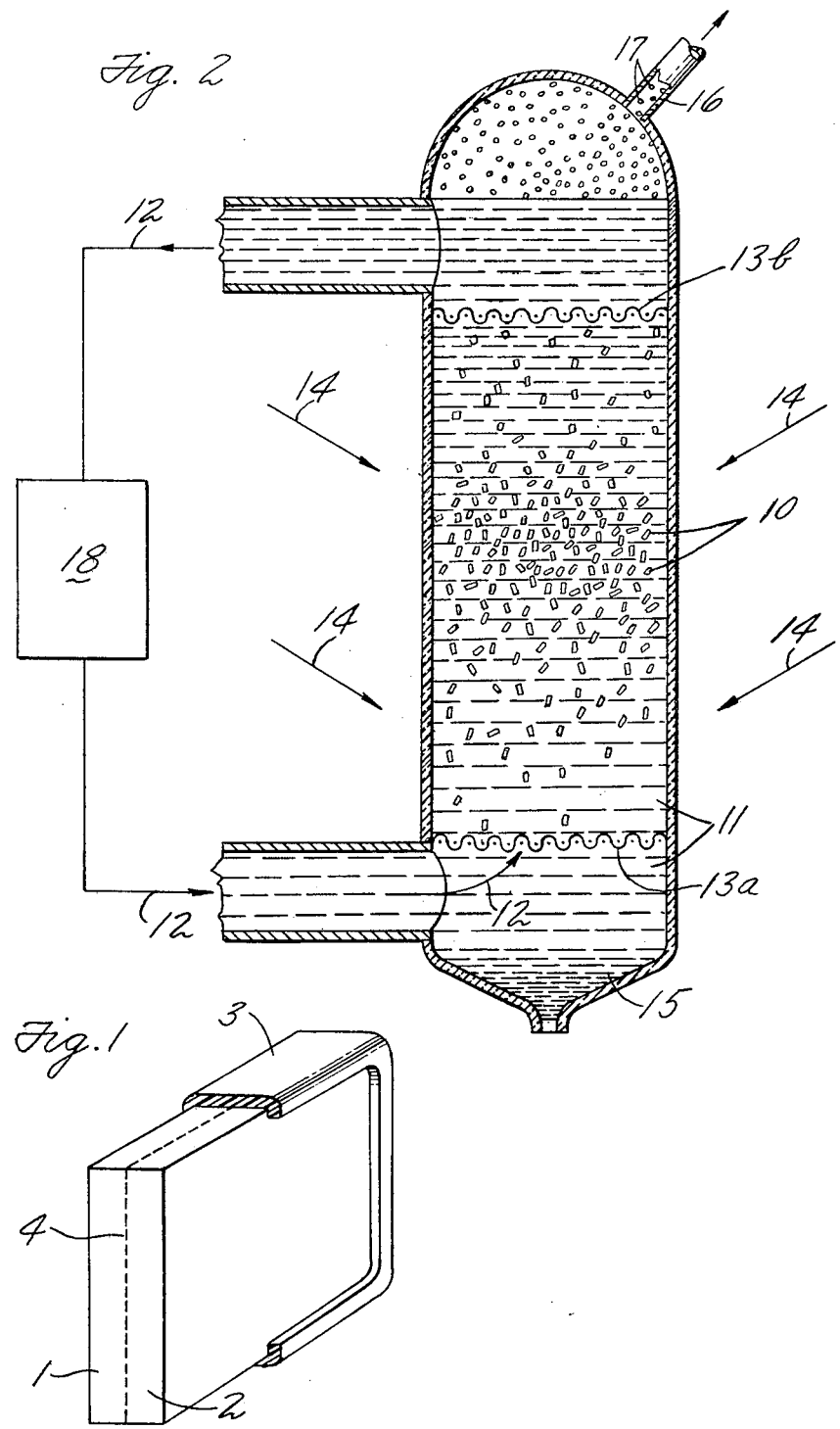

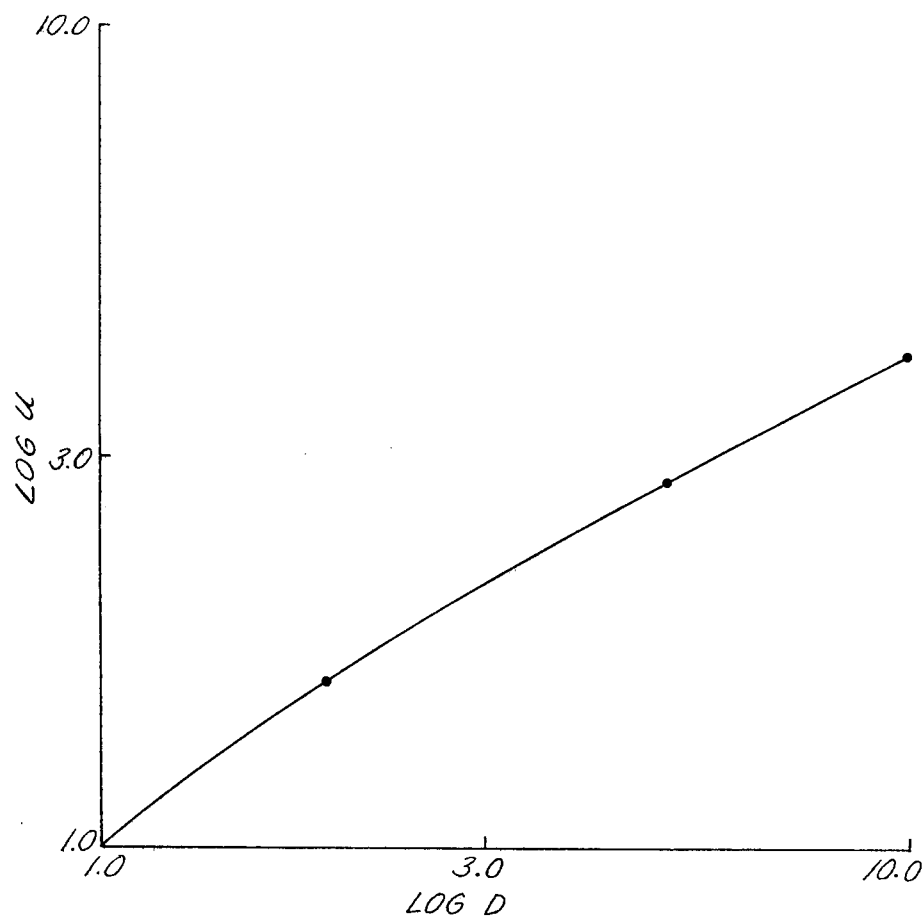

HYDROGEN-BROMINE GENERATION UTILIZING SEMICONDUCTING PLATELETS SUSPENDED IN A VERTICALLY FLOWING ELECTROLYTE SOLUTION

TECHNICAL FIELD

The field of art to which this invention pertains is electrolytic processes for producing hydrogen gas.

BACKGROUND ART

The use of solar energy to power electrolytic cells has received widespread attention in view of recent energy resource depletion and environmental pollution awareness. The production of hydrogen from electrolytic cells and the use of solar energy to power such cells has been recognized as a marriage of two arts which has great potential in the solution of both these problems. And while much work has been done on improving the efficiency of such systems, note commonly assigned and copending applications Ser. Nos. 956,760; 956,761; 56,565 and 65,824 filed Nov. 1, 1978; Nov. 1, 1978; July 11, 1979; and Aug. 13, 1979 respectively, most of this work has centered on the use of conventional electrolytic cells. In a conventional electrolytic or photochemical cell an electrical connection is required between the anode and cathode and such connection is generally external to the cell. In order to produce large amounts of hydrogen from such systems, a considerable number of photoanodes and cathodes would be required, and there is a natural loss of efficiency because of the distance required between such electrodes. Attempts at minimizing this problem have included reducing the distance between the electrodes to reduce the $I^2R$ losses in the electrolyte. Note, for example, U.S. Pat. No. 4,094,751.

What is needed in the art is a processing system with increased efficiency to improve on systems of the prior art.

DISCLOSURE OF INVENTION

In accordance with the present invention a process of converting hydrobromic acid to hydrogen and bromine is described comprising suspending semiconducting platelets in a vertically flowing solution of bromide electrolyte contained in a vertically disposed fluid conduit which is light energy transparent. The platelets are maintained suspended in the vertically flowing electrolyte by controlling the flow rate of the electrolyte. The fluid conduit is impinged with radiant energy of sufficient wavelength to cause sufficient charge transfer in the platelets to dissociate the bromide electrolyte into a bromine liquid and a hydrogen gas. The respective reaction products are collected for subsequent energy generation. The semiconducting platelets useful in the abovedescribed process comprise an n-doped semiconducting layer and p-doped semiconducting layer separated by and contacting a single ohmic contact, the platelet edge being covered by an insulation layer to avoid short circuit and the platelet being of such size and weight as to be capable of substantially static suspension in the flowing electrolyte solution.

BRIEF DESCRIPTION OF DRAWINGS

FIG. 1 describes a typical platelet in accordance with the present invention;

FIG. 2 describes a typical apparatus useful to perform the process of the present invention;

FIG. 4 demonstrates equilibrium velocities for GaAs spheres suspended in a uniform vertical water flow.

Figure 3:
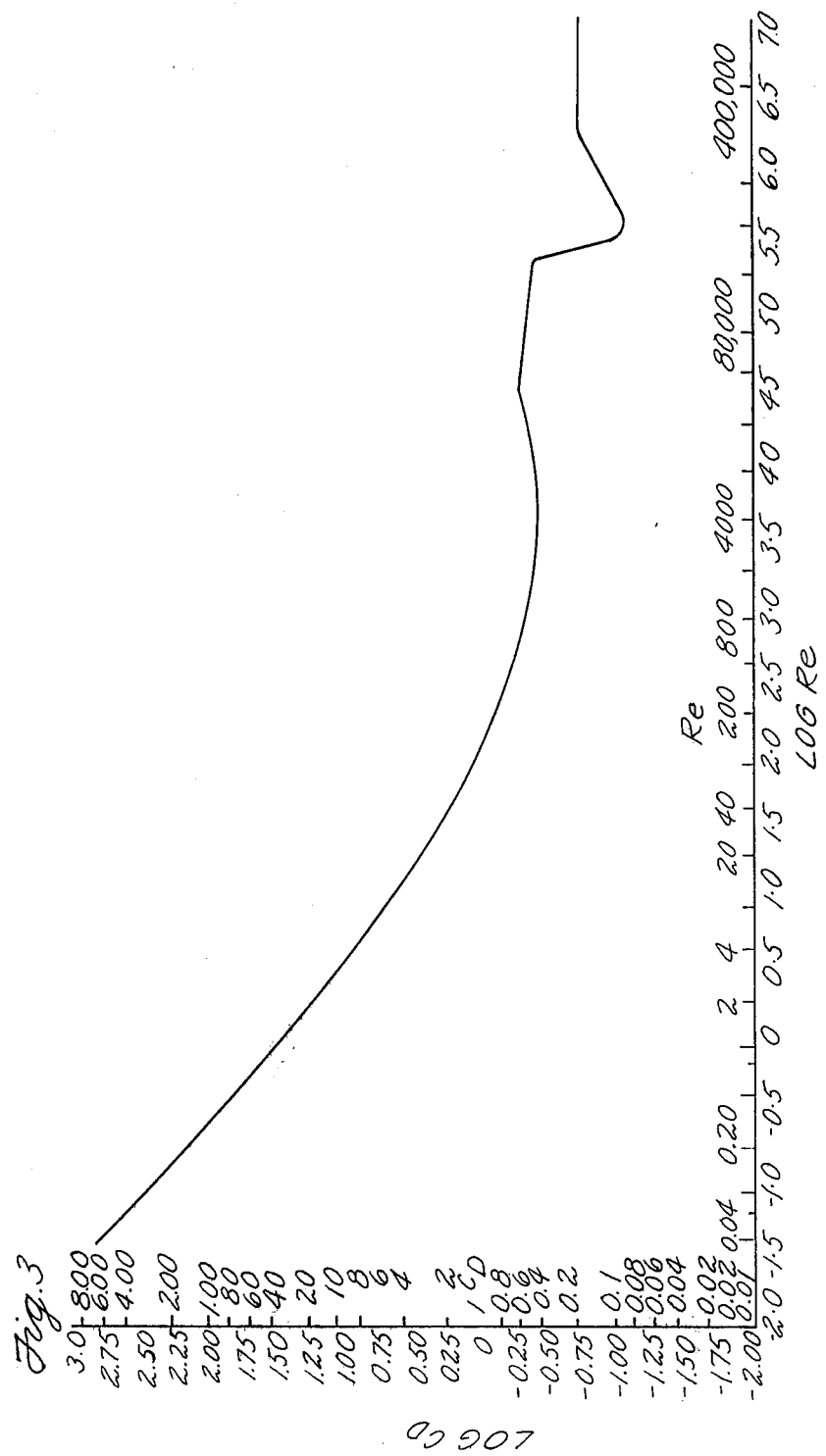
FIG. 3 demonstrates graphically drag coefficient as a function of Reynolds Number for a spherical particle.

The foregoing and other objects, features and advantages of the present invention will become more apparent from the following description of preferred embodiments and accompanying drawings.

BEST MODE FOR CARRYING OUT THE INVENTION

A typical platelet useful in accordance with the present invention is shown by FIG. 1. While a rectangular shape is shown in the figure, the particular shape is not critical. For ease of manufacturing, square or rectangular platelets are preferred; however, spheres, ellipses, parallelepipeds, etc., may also be used. For ease of presentation the calculations infra are based on a spherical "platelet". Although in practice such a particle shape may be difficult to fabricate, a laminate or composite of a more readily formable shape may be used. It should be noted that the calculations here presented would still be representative of any actual vertically flowing system regardless of "platelet" shape. As to the size of the platelet, the size and weight should be large enough to produce the potential difference necessary to dissociate the HBr in the solution but light enough to stay in suspension in the flowing electrolyte. The platelets preferably have a photoactive surface area greater than 1 $mm^2$ on each photoactive side with the thickness as described below. The average weight will vary according to the material used. In fact, by utilizing the vertically flowing system of the present invention great advantage is realized over systems of the prior art (e.g., U.S. Pat. No. 4,094,751) because larger platelets (e.g., with photoactive surface area greater than 1 $mm^2$ on a side) can be used with their greater radiant energy gathering capability.

The platelet has four essential components, an n-doped semiconducting layer, an ohmic contact layer, a p-doped semiconducting layer, and an edgewise insulating layer.

For resistance reasons, it is preferred that both the n-doped and p-doped semiconducting layers are each less than 2 microns thick. The thickness of the ohmic contact should similarly be limited to reduce resistances but will be generally thinner than the semiconducting layers and also preferably less than 2 microns thick.

The composite is preferably formed by conventional deposition methods such as chemical and physical vapor deposition. Either the three components can be sequentially deposited on a releasable substrate or two layers can be either sequentially deposited on either the p-doped or n-doped semiconducting free-formed layer or the semiconducting layers can be deposited on opposite sides of the ohmic contact. The materials can also be mechanically attached, for example, being held together by the edgewise insulation layer. But regardless of how the composite is formed, the presence of the insulation layer should aid in holding the platelet together during use. The insulation layer can be coated on the edge of the ohmic contact or composite or preformed and laminated on. It can also be applied as a bead, e.g., like a caulking compound.

It should be noted that any conventional n-doped and p-doped semiconducting material and ohmic contact and insulation material can be used in the platelets of the present invention with the caveat that there must be sufficient dopant present in both the n- and p-doped semiconducting layers to permit charge transfer through a single ohmic contact layer bridging the two semiconducting layers. In the order of $10^{19}$ to $10^{20}$ atoms of dopant per cc of semiconducting material or about one atomic percent should be sufficient to accomplish this result. The semiconducting material should also be chosen to collect radiant energy of the greatest spectra. However, the individual semiconducting material can be matched to a particular wavelength of radiant energy if it is known in advance that radiant energy of that specific wavelength will primarily be emitted from the radiant energy source. As the n-doped semiconducting material, materials such as amorphous silicon overcoated with a thin layer of platinum and doped with phosphorous, arsenic or antimony; and gallium arsenide doped with sulfur, selenium, tellurium, silicon or tin can be used. As the p-doped semiconducting material, gallium arsenide doped with zinc, magnesium, beryllium or cadmium can be used. Aluminum, gold or molybdenum can be used as the ohmic contact material and as the insulation material conventional materials such as epoxy resin or ceramic insulation material can be used. A mixture of semiconducting material can also be used to take advantage of the different radiant energy wavelength collecting ability of specific semiconducting material.

In FIG. 1, the n-doped semiconductor is indicated as 1 and p-doped semiconductor indicated as 2. The edgewise insulation material (e.g., conventional epoxy resins) is indicated as 3 and shown broken away to expose the ohmic contacts 4. The insulation material can be small enough to simply cover the ohmic contact layer or as shown by FIG. 1, it can be wide enough to in effect edgewise encapsulate the platelet forming a mechanical lock as well on the platelet.

FIG. 2 demonstrates a typical apparatus useful in accordance with the present invention. In this figure, 10 indicates the platelet particles; 11 indicates the hydrobromic acid electrolyte solution flowing as indicated by arrow 12. In this particular embodiment, the flow of the electrolyte is such that the particles remain substantially suspended between the area defined by screens 13a and 13b. Nonconducting screens such as Teflon ® (Dupont) can be employed with openings large enough for smooth electrolyte flow but small enough to contain the platelets. The screens 13a and 13b in FIG. 2 aid in keeping the platelets confined to the designated area in the system, lower screen 13a primarily providing a resting place for the platelets during shutdown and lower screen 13a and upper screen 13b confining errant platelets during positive and negative flow surges and turbulence. The screens can also be made removable if desired once system stability is attained. It is preferred however to leave the screens in place and since the effect of the screens on flow would be greater with a greater flow velocity (as noted in the equations below, the drag is directly proportional to the square of the velocity) this effect can be minimized by reducing the flow rate. If under this combination of circumstances the flow rate is not sufficient to keep the particles suspended, the particles can be made more buoyant, for example, by employing a hollow platelet center. The impinging radiant energy is indicated as 14. As stated, the flowing electrolyte is indicated by arrows 12 and as the hydrobromic acid dissociates the bromine settles to the bottom of the apparatus, the bromine indicated as 15, and the hydrogen gas 17 bubbles to the surface and is expelled through port 16. The hydrobromic acid electrolyte solution can be run through a monitoring station indicated as 18 and additional electrolyte added as needed. Monitoring can be done by conventional solution sampling techniques. And while any basic shape conduit of constant cross section will be useful in accordance with the present invention, the conduit should be radiant energy transparent on all sides. Cylindrical conduits are particularly suitable in this regard. Furthermore, in view of the lack of transparency of the ohmic contact layer it is necessary to illuminate both sides of the platelet with radiant energy simultaneously. This will generally be insured by the diffraction (and to some extent refraction) of the radiant energy off of the tumbling particles in the electrolyte solution. However, it is preferred to have radiant energy reflectors on that side of the fluid conduit opposite the radiant energy source to both improve efficiency and to insure simultaneous illumination of the platelets on all photoactive sides. While straight-angled reflectors are useful and easier to construct, circular cross-section reflectors are preferred to match the preferred circular cross-section conduits.

In operation, the bromine concentration will build up in the electrolyte solution and can also be drawn off for example at location 18 of the apparatus by means of filters but preferably the bromine will settle out as a liquid at high concentrations, for example, at location 15, and can be removed by either draining or preferential extracting with an immiscible solvent such as CCl$_4$.

As stated above, the apparatus according to the present invention is vertically disposed to take advantage of the earth's gravitational forces, vertical being the direction parallel to the earth's gravitational forces. The gravitational forces will act on the platelet semiconducting particles countering the electrolyte solution vertical flow to maintain the particles in suspension in the area defined, for example, by screens 13 in FIG. 2, vertical flow of the solution being flow with a velocity vector parallel to and opposite the gravitational force vector. By selecting the proper flow conditions to counter these gravitation forces, an equilibrium condition is established in the system between the flowing electrolyte and the semiconducting platelets which will maintain the platelets in suspension in the defined area, for example to prevent clumping of the platelets at the top or bottom screen.

To determine representative equilibrium flow conditions for a particular system according to the present invention, the physical relationships defined by the following equations may be used. The terms of such equations are defined as follows:

V = volume of the platelet;
M = mass of the platelet;
d = diameter of platelet (sphere)
D = drag force;
$C_D$ = drag coefficient;
S = area parameter (for a sphere)
$\rho$ = density of working fluid;
u = velocity of working fluid;
$\rho_g$ = density of GaAs;
$\rho_w$ = density of water;
$\rho_E$ = effective density of platelet (sphere) compensating for water = $\rho_g - \rho_w$;

W = platelet weight minus its buoyancy force;
g = gravitational acceleration (32.2 ft/sec$^2$);
$\mu$ = viscosity of working fluid;
$\nu$ = kinematic viscosity of working fluid ($\mu/\rho$)
Re = Reynolds Number ($\rho u d/\mu$).

In the exemplary system described below, calculations are based on GaAs as the platelet material, with a 1 mm spherical diameter, the working fluid being water at room temperature. For actual systems the appropriate corresponding values of the above-defined terms for the particular working fluid, platelet materials and associated dimensions used would have to be substituted into the respective equations infra.

A particle suspended in the manner called for by the present invention will be in equilibrium when its aerodynamic drag plus its buoyancy balances its weight. The drag (D) can be expressed as:

$$D = \frac{C_D S \rho u^2}{2}$$

It is assumed for most systems practiced according to the present invention that the weight will be larger than the buoyancy force, and this resultant vector is called W. Both the drag coefficient and area parameter are functions of the particle geometry, and the quantity $(C_D S)/W$ is frequently called the ballistic coefficient. The particle will be in equilibrium when $$W = C_D S \frac{\rho u^2}{2}$$

or $$\left(\frac{C_D S}{W}\right)\left(\frac{\rho u^2}{2}\right) = 1$$

The area parameter S (frontal area of the platelet exposed to the flow of the working fluid) for a sphere is $\pi d^2/4$ (Schlichting, *Boundary Layer Theory*, 4th ed., p. 15 and Goldstein, *Modern Developments in Fluid Dynamics*, vol. 1, p. 15).

$$W = [(\rho_g V)g - (\rho_w V)g] = [(\rho_g - \rho_w)V]g \text{ or } \rho_E V g.$$

For the sphere-shaped platelet of the exemplary system $V = 4/3 \, \pi r^3 (r = d/2)$. By substituting these values into the equilibrium equation, the result is $C_D = 4/3(\rho_E \, g \, d/\rho \mu^2)$. Since $\rho_E = 332$ lb/ft$^3 - 62$ lb/ft$^3 = 270$ lb/ft$^3$ or 8.39 slug/ft$^3$, $g = 32.2$ ft/sec$^2$, $d = 3.33(10)^{-3}$ ft and $\rho = 1.92$ slug/ft$^3$, the equilibrium flow condition for a spherical "platelet" with a diameter of 1 mm is defined in terms of velocity of the working fluid as $$C_D = 0.625/u^2 \qquad \text{(equation 1)}$$

where u is defined in ft/sec.

$C_D$ is also a function of the Reynolds Number of a flowing system.

$$C_D = f(Re) \qquad \text{(equation 2)}$$

FIG. 3 demonstrates the $C_D$ values for respective Re values for a spherical-shaped particle for substantially all of the working fluids useful in the present invention. This relationship can be determined experimentally for different shaped particles as described by Goldstein infra, pps. 15 and 16 which is the source of both equation 2 and FIG. 2 for a sphere. Reynolds Number is defined as Re = ud/$\nu$. $\nu$ for water at 68° F. (saturated water) = 1.083 (10)$^{-5}$ ft$^2$/sec (Eckert and Drake, *Heat and Mass Transfer*, 2nd ed., p. 500). Accordingly, in terms of u for a 1 mm sphere in water $$Re = 307u \qquad \text{(equation 3)}$$

where u is defined in ft/sec.

TABLE

| | Equilibrium Velocities For GaAs Spheres Suspended Vertically In A Uniform, Vertical Water Flow | | | | |
|---|---|---|---|---|---|
| Spherical Particle Diameter | Equilibrium Condition | Drag Law | Re-Velocity Relation | Equilibrium Velocity | Reynolds Number |
| d | $C_D = \frac{4}{3} \frac{\rho_E}{\rho} \frac{gd}{u^2}$ | $C_D = f(Re)$ | $Re = \frac{ud}{\nu}$ | u | Re |
| 0.1 mm | $C_D = \frac{0.0625}{u^2}$ | $C_D = f(Re)$ | $Re = 30.7u$ | 0.06 ft/sec | 1.84 |
| 1.0 mm | $C_D = \frac{0.625}{u^2}$ | $C_D = f(Re)$ | $Re = 307u$ | 1.0 ft/sec | 307 |
| 5.0 mm | $C_D = \frac{3.13}{u^2}$ | $C_D = f(Re)$ | $Re = 1542u$ | 2.80 ft/sec | 4318 |
| 10.0 mm | $C_D = \frac{6.25}{u^2}$ | $C_D = f(Re)$ | $Re = 3070u$ | 3.92 ft/sec | 12157 |
| 1.9 mm | $C_D = \frac{1.188}{u^2}$ | $C_D = f(Re)$ | $Re = 584u$ | 1.61 ft/sec | 940 |

Equations 1, 2 and 3 represent three simultaneous equations with three unknowns—drag coefficient, Reynolds number and velocity. By selecting the appropriate velocity, all three equations can be satisfied and equilibrium flow conditions determined for the particular system chosen. At this flow rate, the selected particles will be maintained in suspension in the vertically flowing electrolyte in the confined area, e.g., between screens 13 in FIG. 2. For the 1 mm GaAs particles described above in a vertically flowing water system such flow rate would be 1.0 ft/sec. Other representative values for different sized particles are shown in the Table, and graphically by FIG. 4 where u = water velocity in ft/sec and d = particle diameter in mm. To ensure that the platelets are maintained suspended in the working fluid between the screens shown in FIG. 2 and to compensate for turbulent effects, the flow can either be pulsed around the equilibrium flow rate or the location of the platelets can be conventionally monitored and the flow rate of the working fluid either increased or decreased around the equilibrium flow rate accordingly. Conventional solar cells can also be used to provide the energy for such electrolyte pumping. Also, while as stated above in most instances the weight of the platelet will be larger than the buoyancy force of the working fluid and thus the working fluid will be flowed upward through the cylinder, if the opposite is true and the weight of the platelet is less than the buoyancy force of the working fluid, the system can be run by simply reversing the direction of flow of the working fluid from that described above, all flowing still being maintained in a vertical direction. And while the system according to the present invention requires a vertical disposition, small excursions from the vertical, e.g., ± about 5°, can be tolerated and a workable system will still result.

The present invention has been described in terms of producing hydrogen for use in a fuel cell, however, the bromine produced also has fuel cell utility. Note in this regard, an article by Glass et al, "Performance of Hydrogen-Bromide Fuel Cells", *Advances in Chemistry Series*, vol. 47, 1964, A.C.S. Applied Publications, which describes the various advantages of such a system.

The bromide system of the present invention can also be run at reduced pressures and concentrations such that the photoelectrolytic cell can be used with voltages equivalent to the use of such things as hydrogen but with the advantages of dealing with the liquid bromine produced, thus eliminating the problems associated with a product which exists as a solid such as iodine under normal solution conditions. Also, the large optical absorption coefficients of even dilute solutions of other halogen dissociation products such as iodine would have a severely adverse effect on the efficiency of a system which utilizes radiant energy such as light as a power source as in the disclosed invention.

Another advantage of the bromide electrolyte system is the reduced overvoltages and reduced corrosion effects associated with the use of such systems as compared with conventional electrolytes, also broadening the range of semiconductor systems which can be used. Cloride or fluoride electrolyte systems, for example, which are more corrosive than even conventional water dissociation systems and solid iodine dissociation products would all clearly be inferior in the system of the present invention. There are also very definite advantages of the bromide system specifically in the elimination of the overvoltages associated with chloride and especially water dissociation products. Note the Glass et al article mentioned supra at page 204 and U.S. Pat. No. 4,021,323 at column 7.

While solar energy is the preferred source of radiation in the process and apparatus of the present invention, other radiant energy sources can be used such as lower radiation or light emitting solid state diodes, the only requirement being that the radiant energy be of proper wavelength and sufficient intensity to evolve hydrogen gas in the particular system being irradiated. The proper wavelength required relates to the particular semiconductor being used. The wavelength must be short enough to at least match the characteristic of the particular semiconductor used. The semiconductor will not absorb radiant wavelengths longer than its band gap radiation characteristic. In fact, one of the advantages of the use of a bromide electrolyte is the elimination of the corrosion and oxidation problems of other conventional electrolytes which attack many semiconductor materials, thus enabling a broader range of semiconductor material to be used. With a broader range of semiconducting material thus available, a broader range of light wavelength can be used to more efficiently power the system. For example, conventional hydrogen gas generating electrolysis systems such as those run by water dissociation would not permit the use of silicon semiconductors because of the corrosive effects of the free oxygen also produced on such semiconductor. Because of the overpotential required to run such a cell, the corrosive effects of the oxygen in such an environment would be prohibitive. However, in the herein described system because of the lack of an overvoltage problem with the use of bromides such as HBr and the noncorrosive effects of the bromine produced on a silicon semiconductor in such an environment a silicon semiconductor can be used. Therefore, because silicon semiconductors work effectively to convert radiant energy to electrical energy at wavelengths up to 11,000 Å, a greater, more efficient light gathering source can be used in the disclosed system.

Multilayered semiconductor material comprised of a gradient of diminishing width band gap material is also available to the invention process in view of the advantages encompassed in the use of the bromide electrolyte. Note, for example, U.S. Pat. No. 4,011,149 at column 2, lines 18–20 in this regard.

The Nernst equation which governs the cell potential relationship required for electrolysis in this process can be described as follows:

$$E = E° + 0.059 \log P_{H_2} + 0.059 \log C_{Br_2} - 0.059 \log C_{HBr}$$

wherein $E°$ = standard cell potential for cell components (e.g. for HBr electrolysis 1.06 volt), $P_{H_2}$ = partial pressure of hydrogen produced in the cell, $C_{Br_2}$ = molar concentration of bromine liquid produced in the cell, $C_{HBr}$ = molar concentration of hydrogen bromide or other bromide in the cell, $E$ = the threshold voltage or cell potential to be overcome by the photovoltage. This is the voltage at which current begins to flow in the cell and significant amounts of hydrogen and bromine begin to evolve.

The preferred parameters for efficient operation of the systems of the present invention are:

$P_{H_2} > 0.05$ psi $C_{Br_2} > 0.1\%$ $C_{HBr} < 48\%$

A cell with such parameters can be efficiently run at temperatures between about 0° and 100° C. Percents as recited throughout the disclosure are percents by weight.

As stated above, the key component in the electrolytic solution is the bromide compound present in the solution in amounts up to about 50% by weight, with a concentration of about 48% by weight preferred. This provides the hydrogen (and bromine if desired) to run the ultimate fuel cell which the photoelectrolytic cell is intended to produce. While water is the preferred solvent for the electrolyte, and hydrogen bromide the preferred electrolyte, the system is readily adaptable to other solvents and bromine containing electrolytes. For example, alcohols or amines may be used as solvents for the system and such bromide electrolytes as KBr, NaBr, LiBr, CsBr and SrBr$_2$ may be used either individually, as mixtures or admixtures with the HBr. If alcohol or amine solvents are employed it is preferred to add at least small amounts of water to the system especially if a bromide other than HBr is used as the bromide electrolyte. The concentration of the hydrogen bromide may be any concentration up to the saturation point of the solution (e.g., about 50% by weight and preferably about 48% by weight), provided the cell potential does not reach the corrosion potential for the semiconductor being used. The system may also be run at any operable pressure with up to 1 atmosphere being preferred.

As mentioned above, the source of energy to run the cell can be any radiant energy source with wavelengths shorter than the gand gap radiation characteristic of the semiconductor used. For example, for a silicon semiconductor, any light source with wavelengths less than 11,000 Å could run the system. Also, as mentioned above, one of the advantages of the hydrogen bromide system is the broadened range of semiconductor material available by using the bromide electrolyte, and the cell potentials and lack of corrosion resulting from such use.

Although this invention has been shown and described with respect to a preferred embodiment, it will be understood by those skilled in this art that various changes in form and detail thereof may be made without departing from the spirit and scope of the claimed invention.

What is claimed is:

1. A process for producing hydrogen gas and bromine liquid from an electrolyte solution comprising suspending a plurality of semiconducting platelets in a vertically flowing solution of bromide electrolyte, said electrolyte flowing in a vertically disposed radiant energy transparent cylindrical conduit and the platelets suspended in a designated area in said conduit defined by upper and lower nonconductive screens, the location of the platelets in the vertically flowing electrolyte being controlled by the flow rate of the electrolyte, the platelets comprising a single ohmic contact layer sandwiched between an n-doped semiconducting layer and a p-doped semiconducting layer, with a layer of electrical insulation covering the exposed edge of the ohmic contact, impinging said platelets with radiant energy sufficient to cause the evolution of hydrogen gas at the surface of the p-doped semiconducting layer and bromine liquid at the surface of the n-doped semiconducting layer, and collecting the hydrogen and bromine so produced.

2. The process of claim 1 wherein the bromide electrolyte is present in an amount of up to about 50% by weight and the solvent is water.

3. The process of claim 1 wherein the radiant energy is solar energy.

4. The process of claim 1 wherein the electrolyte flow rate is controlled by pulsing the flow.

5. The process of claim 1 wherein the electrolyte flow rate is controlled by monitoring the position of the platelets and increasing or decreasing the flow rate accordingly.

6. The process of claim 1 wherein the platelet has a photoactive surface area greater than 1 mm$^2$ on each photoactive side.

* * * * *